(12) United States Patent
Pradhan et al.

(10) Patent No.: US 8,005,935 B2
(45) Date of Patent: Aug. 23, 2011

(54) METHODS AND COMPUTER PROGRAM PRODUCTS FOR MANAGING APPLICATION PERFORMANCE ON A NETWORK

(75) Inventors: Prashant Pradhan, Mamaroneck, NY (US); Debanjan Saha, Mohegan Lake, NY (US); Sambit Sahu, Hopewell Junction, NY (US); Manpreet Singh, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 11/696,975

(22) Filed: Apr. 5, 2007

(65) Prior Publication Data

US 2008/0250135 A1    Oct. 9, 2008

(51) Int. Cl.
*G06F 15/173* (2006.01)
*G06F 15/16* (2006.01)
*G06F 15/177* (2006.01)

(52) U.S. Cl. .................. 709/223; 709/235; 715/734

(58) Field of Classification Search .................. 709/223, 709/224, 226, 232–235; 715/734, 736; 370/229–232, 338, 351, 468
See application file for complete search history.

(56) References Cited

U.S. PATENT DOCUMENTS

| | | | |
|---|---|---|---|
| 7,047,311 B2 * | 5/2006 | Oishi et al. | 709/233 |
| 7,681,131 B1 * | 3/2010 | Quarterman et al. | 715/736 |
| 2008/0056207 A1 * | 3/2008 | Eriksson et al. | 370/338 |
| 2009/0052316 A1 * | 2/2009 | Aso et al. | 370/217 |

* cited by examiner

*Primary Examiner* — Peling A Shaw
(74) *Attorney, Agent, or Firm* — Cantor Colburn LLP; Brian Verminski (57) ABSTRACT

Managing application performance on a network. A network graph is generated from a set of application endpoints on the network. The network graph is annotated by associating one or more of the application endpoints with at least one of a corresponding latency annotation or a corresponding available bandwidth annotation. An end to end plan is formulated from the annotated network graph, wherein the plan maps one or more application requirements onto the plurality of paths in accordance with one or more end to end control adjustments including at least one of a server selection adjustment, an internet service provider (ISP) selector, or an overlay routing adjustment.

5 Claims, 5 Drawing Sheets

METHODS AND COMPUTER PROGRAM PRODUCTS FOR MANAGING APPLICATION PERFORMANCE ON A NETWORK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates generally to computer networks and, more specifically, to methods and computer program products for managing application performance on a network.

2. Description of Background

For software applications, network performance and availability are key determinants of end-to-end performance and user experience. In many cases, network performance is difficult to manage due to the distributed nature of network resources. Various approaches for managing network performance have been developed, including quality of service (QoS)-based techniques, techniques using network latency maps, and techniques using simple network management protocol (SNMP) to identify network bottlenecks.

Network performance management has traditionally been performed using quality of service (QoS) functionality. QoS refers to a set of control mechanisms that accord different priority levels to network traffic for different users or data flows. Illustratively, these control mechanisms guarantee a specified level of performance in accordance with requests received from application software. A network that supports QoS may formulate a traffic contract with application software and reserve capacity in one or more network nodes. QoS monitors an achieved level of network performance, illustratively in terms of data rate and delay, and dynamically controls scheduling priorities in the network nodes. By analyzing traffic demands and the underlying structure of the network, a brokering mechanism applies QoS functionality to one or more applications to provide planning and admission control. Adequate brokering and QoS-based infrastructure suitable for managing network performance has not yet been developed.

As an alternative or supplement to a QoS-based approach, some existing techniques for managing network performance generate a network latency map by monitoring network activity. The network latency map shows traffic delays at each of a plurality of network nodes, whereupon traffic is routed along one or more paths to avoid nodes having the greatest delays. However, this approach is not effective for managing networks in the context of applications which generate a significant demand for bandwidth, such as voice conferencing services with a large number of participants or video conferencing services.

Other existing network management techniques utilize simple network management protocol (SNMP) to identify bottlenecks in the network. In conjunction with a network management system (NMS), SNMP monitors network-attached devices for conditions that may warrant administrative attention. Although SNMP is capable of identifying a bottleneck on the network, it is not capable of isolating bottlenecks on node-to-node paths.

In view of the foregoing considerations, what is needed is an improved technique for managing application performance on a network so as to provide enhanced performance relative to existing network management approaches.

SUMMARY OF THE INVENTION

The shortcomings of the prior art are overcome and additional advantages are provided through the provision of a method for managing application performance on a network where the method includes generating a network graph from a set of application endpoints on the network, the network graph being indicative of a plurality of paths between the application endpoints, the plurality of paths each including a plurality of available resources on the network; annotating the network graph by associating one or more of the application endpoints with at least one of a corresponding latency annotation or a corresponding available bandwidth annotation, wherein the latency annotation includes one or more application performance constraints and the available bandwidth notation includes one or more capacity constraints; formulating an end to end plan from the annotated network graph wherein the end to end plan maps one or more application requirements onto the plurality of paths in accordance with one or more end to end control adjustments. The end to end control adjustments include at least one of a server selection adjustment, an internet service provider (ISP) selector, or an overlay routing adjustment. The server selection adjustment permits selection of a server from a plurality of servers for each of a plurality of clients based upon a traffic demand for each of the plurality of clients and an available bandwidth between each of the plurality of clients and each of the plurality of servers. The ISP selector permits selection of a respective ISP for each of a plurality of corresponding client/server requests. The overlay routing adjustment maps a traffic demand for an application among a set of endpoints on the network.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution wherein one or more end to end control adjustments are provided for mapping application requirements onto a network in accordance with an end to end plan developed from an annotated network graph indicative of available resources on the network.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Like reference numerals are used to refer to like elements throughout the drawings. The detailed description explains the preferred embodiments of the invention, together with advantages and features, by way of example with reference to the drawings.

Figure 1:
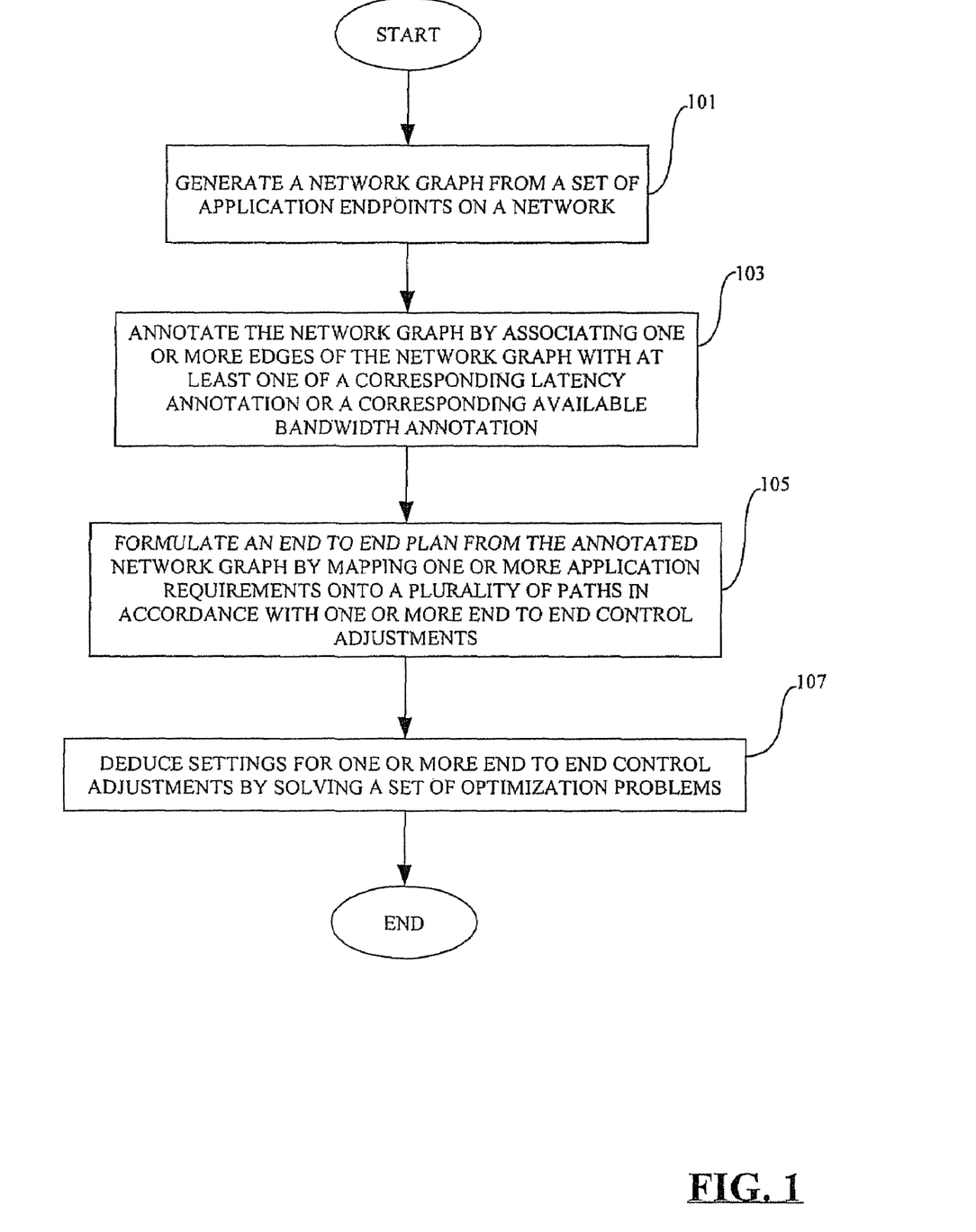
FIG. 1 illustrates an exemplary method for managing application performance on a network.

One embodiment of the network performance management techniques disclosed herein maps application traffic onto one or more network paths such that bandwidth demand of the application will fit within the bandwidth available on these paths, and such that latency on these paths will not exceed a predetermined limit. With reference to FIG. 1, this mapping process is performed as follows. At block 101, a network graph is generated from a set of application endpoints on a network. The network graph is indicative of a plurality of paths between the application endpoints. The plurality of paths each include a plurality of available resources on the network. Illustratively, this step is preformed by capturing routing constraints between pairs of endpoints to create an internet protocol (IP)-level topological map or graph having one or more edges. Each edge represents an application endpoint. Illustratively, the graph may be derived purely from end to end measurements. The graph expresses constraints on network path routing and exposes path sharing, both of which are used for capturing constraints on packing application bandwidth demand within available network capacity.

At block 103, the network graph is annotated to generate an annotated network graph. Each of the one or more edges (i.e., application endpoints) of the graph are annotated with a corresponding latency annotation and a corresponding available bandwidth annotation. Bandwidth annotation is used to express one or more capacity constraints, whereas latency annotation is used to express one or more performance constraints.

Next, at block 105, an end to end plan is formulated from the annotated network graph. The end to end plan maps one or more application requirements onto the plurality of paths in accordance with one or more end to end control adjustments. For example, the end to end plan may map traffic onto the network in accordance with one or more bandwidth constraints applicable to available network resources, and also in accordance with one or more network routing considerations.

Settings for one or more end to end control adjustments are then deduced by solving a set of optimization problems (block 107). The end to end control adjustments include at least one of a server selection adjustment, an internet service provider (ISP) selector, and an overlay routing adjustment. The server selection adjustment permits selection of a server from a plurality of servers for each of a plurality of clients based upon a traffic demand for each of the plurality of clients and an available bandwidth between each of the plurality of clients and each of the plurality of servers. The ISP selector permits selection of a respective ISP for each of a plurality of corresponding client/server requests. The overlay routing adjustment maps a traffic demand for an application among a set of endpoints on the network.

Figure 2:
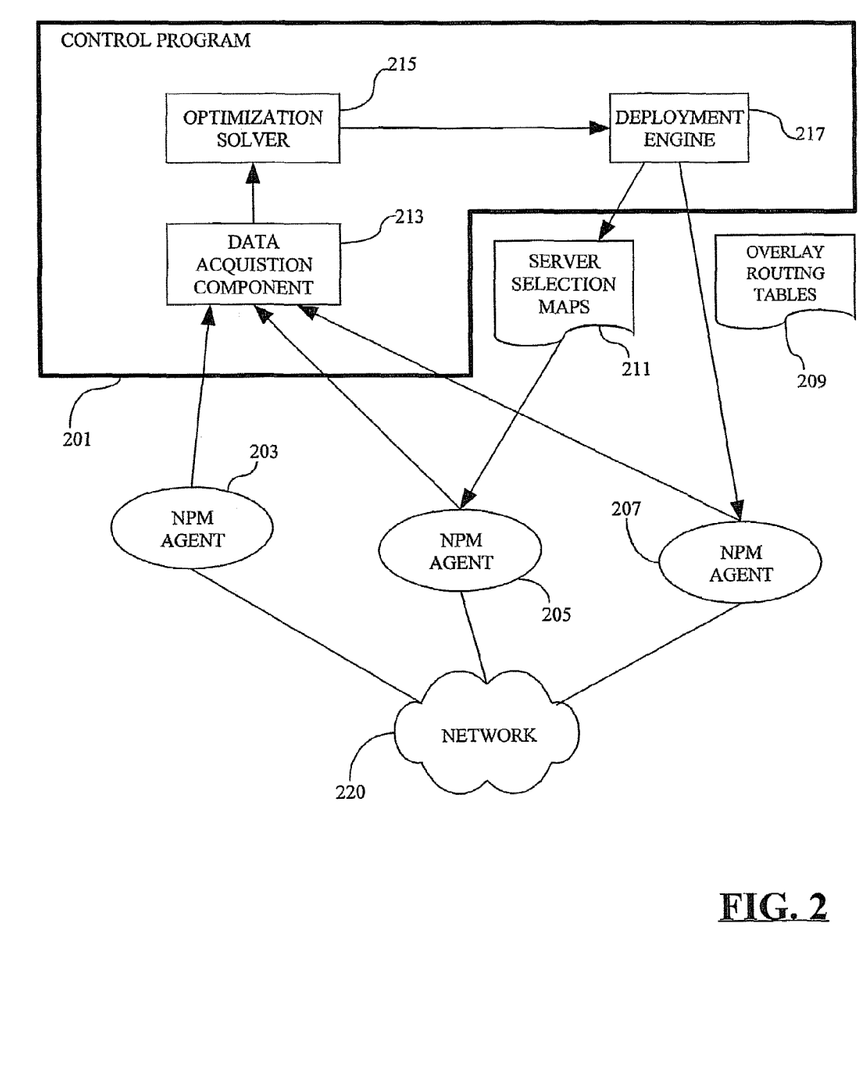
FIG. 2 illustrates an exemplary system for use with the method of FIG. 1.

FIG. 2 is a block diagram showing an exemplary system for managing application performance on a network. The application provides the system with a set of communication endpoints and traffic demand between these endpoints. The specification of endpoints and traffic demand may be simplified by equipping the application with a callback that notifies the system about a source, a destination, and a size of all network transfers performed by the application. This allows the system to maintain and populate a traffic demand matrix internally. This also gives the system the added flexibility to aggregate multiple endpoints (i.e., clients) into prefixes representing networks that the endpoints belong to, thus yielding more scalability to monitoring and planning. Thus the application implicitly provides its bandwidth requirements to the system. On the other hand, the average delay requirement is specified explicitly. The application also specifies an end to end control adjustment selected from a set of end to end control adjustments, whereupon the system returns a recommended control adjustment setting to meet the application's performance requirements.

With reference to FIG. 2, a centralized control program 201 includes a data acquisition component 213, an optimization solver 215, and a deployment engine 217. Control program 201 interacts with a plurality of network performance manager (NPM) agents 203, 205, 207. The role of NPM agents 203, 205, 207 is twofold. First, NPM agents 203, 205, 207 provide a simple socket endpoint so that the control program can orchestrate monitoring by running probe flows between selected pairs of endpoints. NPM agents 203, 205, 207 also receive the recommended control adjustment setting, thereby permitting local configuration changes such as populating servers in server selection maps 211 to achieve the appropriate server selection and populating application-layer overlay routing tables 209 in overlay nodes. NPM agents 203, 205, 207 may be executed as threads within an application, or as separate processes, and are fired up upon application startup on a server, or as an applet on a client browser using the application.

Data acquisition component 213 collects monitoring data from NPM agents 203, 205, 207 to create an annotated graph between endpoints. This annotated graph feeds into optimization solver 215. Optimization solver 215 determines a setting for one or more application-specified end to end control adjustments so as to meet application performance requirements. Finally, this setting is converted by deployment engine 217 to XML configuration files and sent to NPM agents 203, 205, 207 which execute local configuration and/or control actions.

The underlying network topology which provides interconnections among a set of endpoints for an application, as well as the capacities of the links or paths in the network, are used for planning and determining the settings of one or more end to end control adjustments. The foregoing information may be provided to the system of FIG. 2 by any tool that is equipped to take as input a set of endpoints for a network application and process this set to output an annotated graph representing network connectivity and capacity between the set of endpoints. For example, an exemplary tool known as Netmapper uses pairwise traceroutes between the endpoints to obtain an IP-layer topological map of the network. Netmapper then annotates the edges of this graph, to the extent possible, with their available bandwidth and latency. One or more of these edges represent an endpoint for the application. Assuming that one can obtain the latency annotation using per-hop delays reported by traceroute, obtaining bandwidth annotation will now be addressed.

Netmapper uses end-to-end probe flows to annotate links inside the network. The extent to which Netmapper is able to annotate links depends upon the set of endpoints available to it for running probe traffic. As more endpoints become available from a set of applications, Netmapper is able to refine the annotation with more detail.

Any algorithm may be used to annotate links of a network graph with a bottleneck bandwidth. One possible approach exists by which internal links of a network graph may be annotated based upon the bandwidth available on a given set of paths. A basic algorithm for annotating a link in the network with its capacity is by saturating the link such that no more traffic can be driven through the link. An indication of saturation is that the received traffic rate is less than the transmission rate of all flows driven through the link, and the capacity is simply the received traffic rate. Probe flows can be orchestrated in a way that links of the network are successively saturated and annotated. The primary objectives in the selection of these flows should be to minimize the amount of probe traffic in the network, to minimize the number of simultaneous probe flows in the network, and to minimize the number of steps in the algorithm.

Implementation of the basic link annotation algorithm described in the foregoing paragraph is easily amenable to dynamic programming where the maximum amount of traffic that can be driven into a link from a set of annotated subgraphs can be computed, and then the computed flow can be driven through the link to determine whether or not the link is saturated. However, the algorithm generates progressively more simultaneous flows in the network as the size of the subgraphs increases.

Netmapper uses a powerful primitive that can significantly reduce the number of probes and amount of probe traffic required by the basic link annotation algorithm. This primitive is bottleneck identification. By identifying a bottleneck on a path, we are not only able to annotate the bottleneck link in one step, we also eliminate a number of probe steps proportional to the size of the subgraph hanging off the bottleneck link. This concept is illustrated in the subgraphs of FIGS. 3A-3C.

Figure 3A:
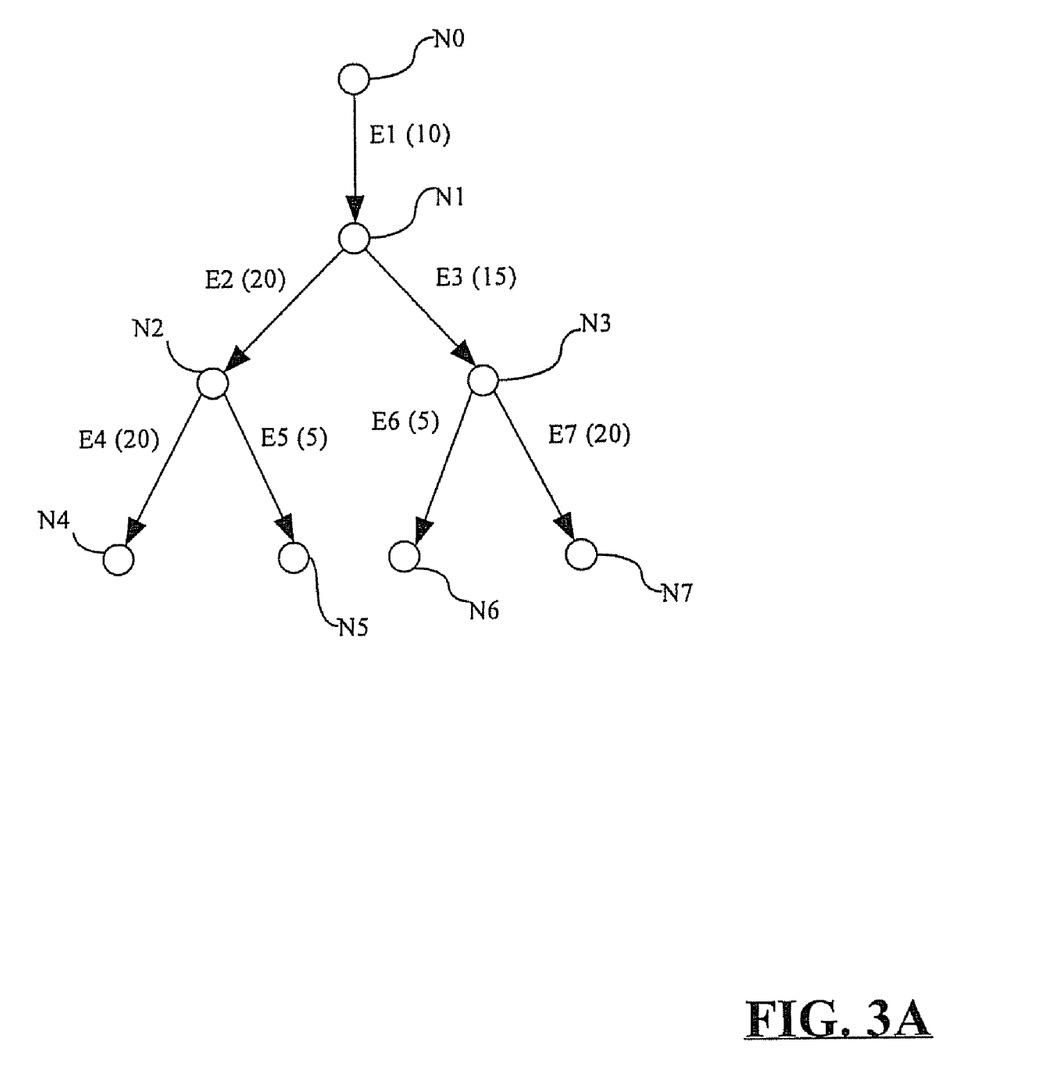
FIGS. 3A-3C illustrate exemplary annotated network graphs for use with the method of FIG. 1.
Figure 3B:
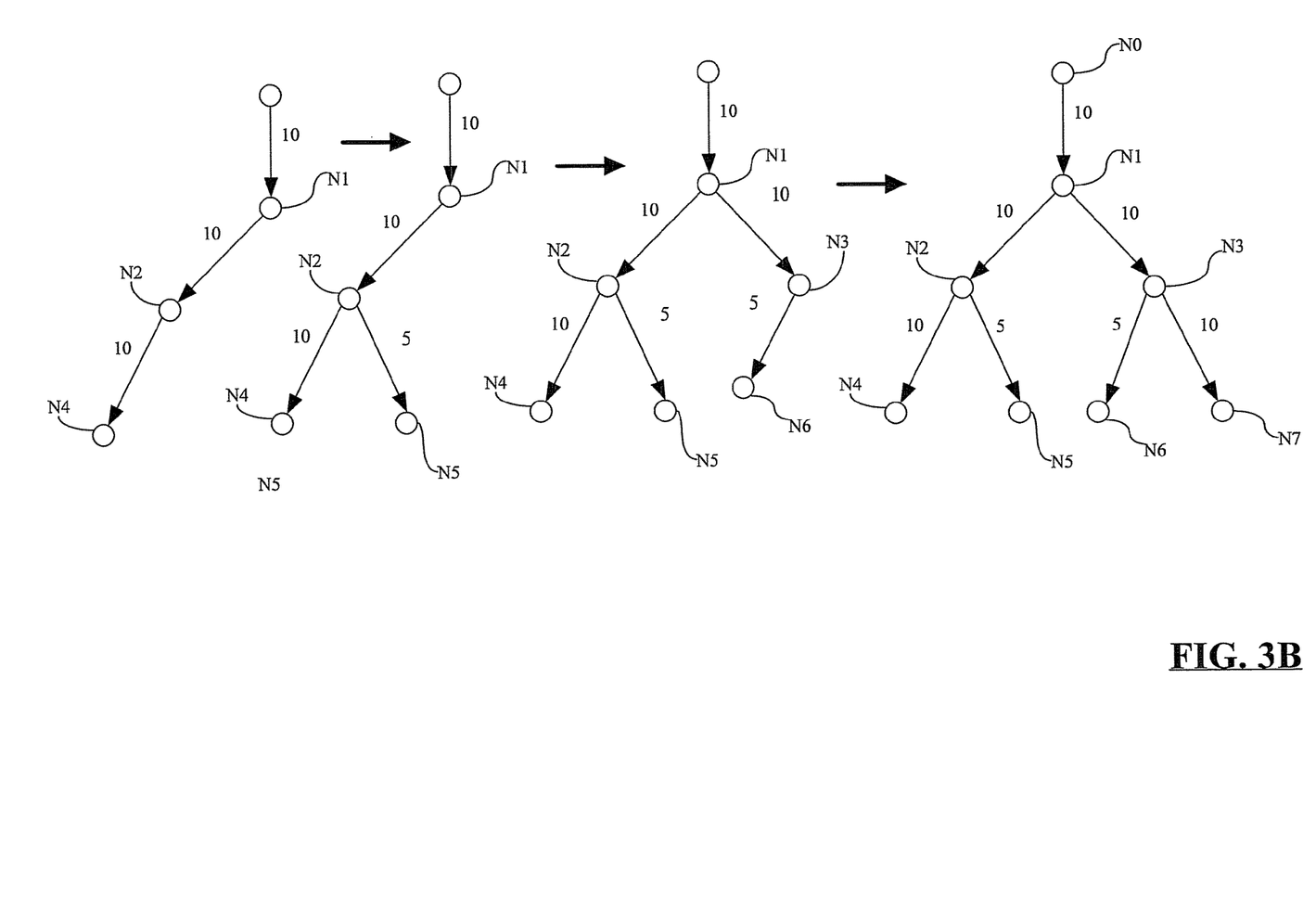
Figure 3C:
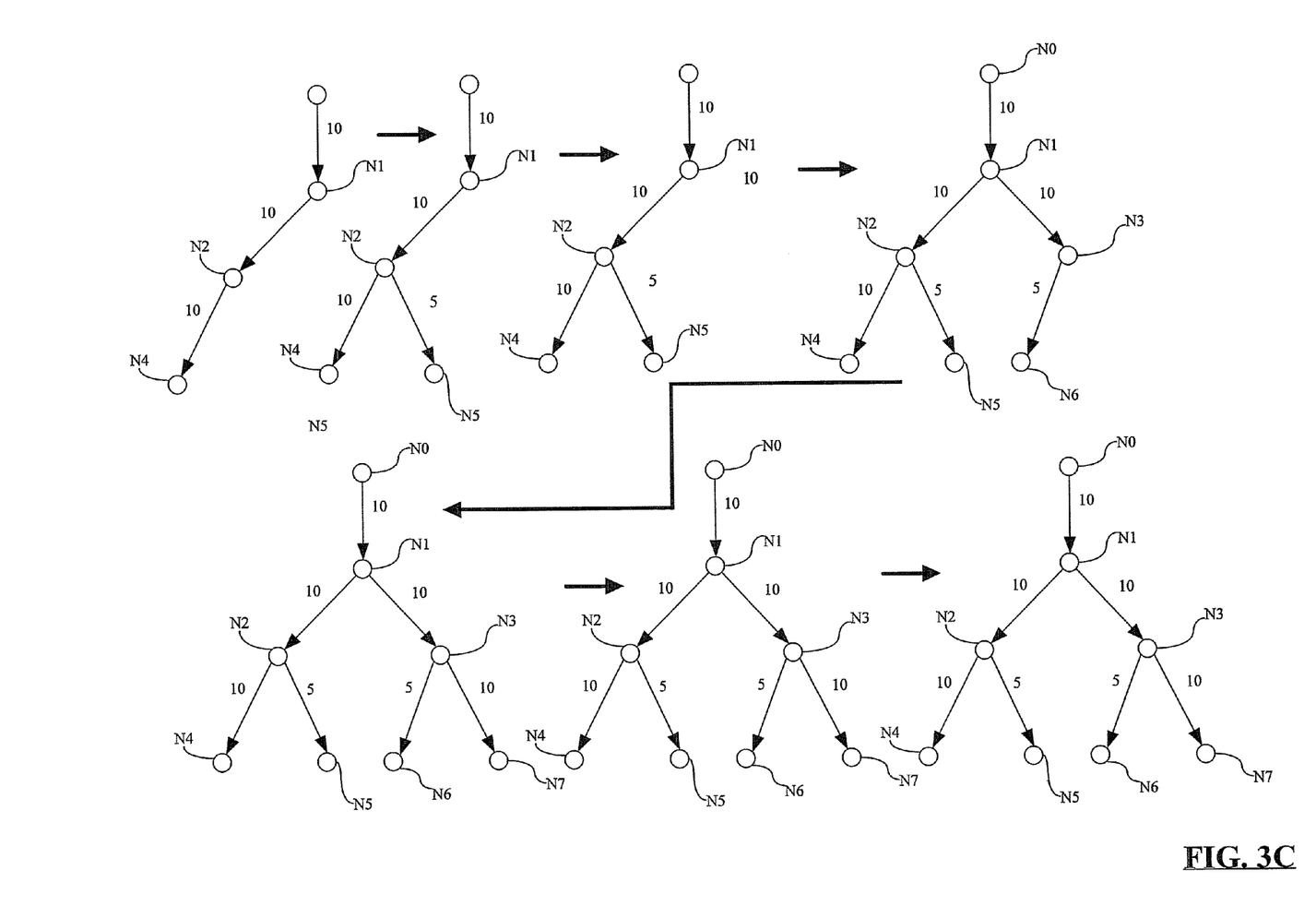

FIGS. 3A-3C show exemplary subgraphs annotated with link capacities for a plurality of paths in a network. With reference to FIG. 3A, actual link capacities are shown between a plurality of nodes denoted as N0, N1, N2, N3, N4, N5, N6, and N7. A plurality of graph edges are shown as E1, E2, E3, E4, E5, E6, and E7. FIG. 3B shows annotation steps using the basic link annotation algorithm described previously, whereas FIG. 3C shows annotation steps using bottleneck identification.

Referring now to FIG. 3C, assume that the basic link annotation algorithm discussed previously starts with a probe between N0 and N4, the path bandwidth is 10, which means that at least 10 units of bandwidth is available on edges E1, E2, and E4. No more information can be gathered from this path. Hence, the algorithm then runs a probe between N0 and N5, yielding a bandwidth of 5 units. The algorithm then tests how much data can be pumped through edge E2, and this results in a value of 15 bandwidth units. Running both flows together yields 10 and, therefore, E2 is annotated with 10. Running a probe between N0 and N6 yields 5, which annotates E3 and E6 with 5. Running a probe between N0 and N7 yields 10, which annotates E3 and E7 with 10. We must now test how much data can be pumped through E3, and this is determined to be 15 bandwidth units. Running both flows together yields 10, hence E3 is annotated with 10 as well. Finally, edge E1 must be tested for saturation at 15, by starting flows in each subtree, thereby yielding 10 as the annotation for E1. The total number of steps taken by the algorithm is seven, three of which require driving multiple probe flows into the network.

Next, consider the required steps with bottleneck identification. With reference to FIG. 3B, when the flow from N0 to N4 is started, E1 is identified as the bottleneck and is annotated in one step. More importantly, the steps to annotate the subtrees are significantly reduced. Due to E1 being bottlenecked at 10, there is no way to pump more than 10 units of bandwidth into any path. Hence, we only need to see if any link in the subtree rooted at N1 has less bandwidth than 10. By running one probe each to N4, N5, N6, and N7, and identifying bottleneck links along the path, this refines the annotation of E5 and E6, yielding a complete annotation in four steps, each requiring only one probe flow. Note that if any link in the subtree that turns out to be a bottleneck has another subtree hanging off of itself, the same simplification described above applies to the latter subtree.

A complete annotation algorithm can be derived as follows, where the complete annotation algorithm is an improvement over the basic link annotation algorithm described previously. When a link is identified as a bottleneck, the link having a bandwidth capacity denoted as C, all paths of which this link is a part are considered. Each edge on each of these paths is annotated with C up to the point where another path is incident on this path. The rationale is that, for edges in this part of the path, there is no way to drive more traffic into the edge than C. Since IP routing from a source to a set of destinations has a tree structure, this yields a significant reduction in the probe traffic that needs to be generated to annotate links downstream from a bottleneck link.

An integral part of the complete annotation algorithm includes a bottleneck identification mechanism. The key challenge in bottleneck identification is that we can only rely on end to end measurements to isolate an internal network property. An interesting approach to this problem is to correlate an increase in the traffic rate of a flow with an increase in the per-hop delay reported along its path by traceroute, and then to identify the hop showing the maximum increase in delay as the bottleneck link. A key limitation of this approach is that it uses an unresponsive user datagram protocol (UTDP) flow to ramp up traffic on a path. Though UDP is the only viable choice when we have control over only one of the endpoints of the path, several undesirable properties result from this choice. First, the UDP flow may push away background traffic from the bottleneck link, causing the probe flow to open up the bottleneck, potentially leading to incorrect identification of the bottleneck. Secondly, a collection of UDP probes can be extremely intrusive to other traffic on the network. Finally, the bottleneck for a UDP flow may not represent the bottleneck for a transmission control protocol (TCP) flow.

One approach to developing a bottleneck identification mechanism uses the built-in bandwidth ramp-up functionality of TCP to induce and detect a bottleneck in the network. For example, consider a version of TCP known as TCP Vegas which reacts proactively to impending network congestion by reacting to an increase in round trip time (RTT) before incurring a loss event. The premise is that there is a stable, detectable increase in queueing delay before a loss will occur. However, this increase in queueing delay lasts only for a few RTTs and, hence, must be detected within that timescale. Thus, in order to identify bottlenecks in conjunction with TCP, traceroute must be able to sample the increased delay quickly. Standard traceroute, however, can take time proportional to the number of hops in the path times the RTT to obtain a result. Hence, standard traceroute is modified to send multiple Internet control message protocol (ICMP) packets with increasing TTL values in parallel. This permits obtaining the per-hop delay in one RTT, and provides the sampling frequency needed for bottleneck identification to work with TCP.

Settings for one or more end to end control adjustments may be determined using a small set of optimization problems. Although the set of end to end control adjustments may include a fewer or a greater number of adjustments than described herein, the optimization approach set forth hereinafter is applicable to any number of control adjustments. Illustratively, planning is performed on a coarse time scale using averaged values of traffic demand and network capacity.

First consider the server selection adjustment which permits selection of a server from a plurality of servers for each of a plurality of clients based upon a traffic demand for each of the plurality of clients and an available bandwidth between each of the plurality of clients and each of the plurality of servers. Assume a set $C=c_1, \ldots, c_n$ of clients or client networks, and a set $S=s_1, \ldots s_n$ of servers. Each client $c_i$ has a traffic demand $f_i$. We must determine an allocation of each client to exactly one server such that the traffic demands of the maximum number of clients packs within the available network capacity. Indicator variables $I_{ij}$ are defined such that $I_{ij}=1$ if server j is chosen for client i, and 0 otherwise. The network graph is modified b adding an edge to each client node i with capacity $f_i$.

There are m, n indicator variables. These indicator variables are arranged in a column matrix X such that $X_{m.i+j}=I_{ij}$. Thus indices of X correspond to I written in row-major form. Since each (i, j) combination corresponds to a path, this yields an ordering on these in m.n paths.

If there are E edges (i.e., application endpoints) in the graph, a matrix A may be defined with E rows and m, n columns where $A_{ij}=f_i$ if path j passes through edge i. Note that path j goes between server j mod m and client j div m. A capacity column vector B is defined where $B_i$ is the capacity of edge i. By introducing the extra edge capacity $f_i$ to client i, this ensures that the feasible settings of the indicator variables will be such that exactly one of $I_{ij}$ will be 1, ie., exactly one server will be selected for each client.

It is desirable to maximize the number of clients whose demand can be packed into the network. This maximization may be accomplished by selecting an appropriate server mapping. Since the feasible solution only turns on one indicator variable for each client, it is sufficient to maximize the sum of all indicator variables. An appropriate formulation is thus given by the integer linear program as follows:

Max CX $AX \leq B$, $0 \leq X_i \leq 1$ $X_i \in I$ $\forall i$

Since flows are to be packed between designated endpoints, a latency requirement can be factored in by pruning the set of flows whose end to end delay does not meet the latency requirement.

The end to end control adjustment for the ISP selector operates as follows. Assume use of a multi-homed server, a set $C=c_i, \ldots c_n$ of clients, and a set $S=s_1, \ldots s_m$ of ISPs to which the server connects. Each client $c_i$ has a flow request $f_i$. An allocation of each client to exactly one ISP needs to be performed. From a mathematical standpoint, this problem is substantially similar to the server selection process described previously. Thus, the same problem formulation may be utilized for server selection and ISP selection. While solutions to integer linear programs (ILPs) are not efficient in general, in the specific instance of packing problems as discussed previously, efficient approximation algorithms exist and are well known to those having ordinary skill in the relevant art.

The end to end control adjustment for overlay routing operates as follows. Note that, in cases where traffic is to be routed between two given endpoints with latency and bandwidth constraints, simple (often polynomial) solutions apply. However, routing while packing traffic demand between all pairs of endpoints is a difficult problem. First, define a set $C=c_1, \ldots c_N$ of N nodes, each node representing an application endpoint, wherein all of the endpoints can function as intermediate routing nodes. A traffic demand matrix A is defined between these endpoints where $A_{ij}$ is the traffic demand from $c_i$ to $c_j$.

To formulate an appropriate optimization problem, two constraints are utilized. One is flow conservation, which is an elegant technique for capturing routing choices. The other constraint is edge capacities. To formulate flow conservation, define an incident matrix I such that $I_{i,j}=1$ if edge j enters node i and $I_{i,j}=-1$ if edge j leaves node i. A flow column vector F is defined such that $F_i$ represents the flow on edge i. Then I.F is an array where the $i^{th}$ entry is 0 if node i is an intermediate node, or a positive number equal to the net flow into the node if i is a pure sink node, or a negative number equal to the net flow out of the node if i is a pure source node.

Traffic demand between any two endpoints are considered as separate flows, akin to a multi-commodity flow problem. Using $F_p$ to represent a matrix of edge flows for commodity p, a flow conservation constraint for each flow may be written as $I.F_p=K$ where K is a vector with value $A_{i,j}$ for source node I, and value $-A_{i,j}$ for sink node j.

The capacity constraint is straightforward, given by: $\Sigma_p F_p \leq B$ where B is the edge capacity vector as defined in the previous formulation. These two constraints capture the feasible values for the flows. It is desirable to select flows that also minimize latencies. This can be accomplished by assigning a unit cost to each link and by minimizing the cost. The formulation thus becomes:

Min $\Sigma_p C.F_p$ $I.F_p = K$ $\Sigma_q F_q \leq B$ $F_p[i] \geq 0$ $\forall p$ Since this formulation involves considerable size and complexity, a suitable heuristic may be utilized to solve this formulation. One example of a suitable heuristic is described by Kodialain, Lakshman and Sengupta in an article entitled, *Online Multicast Routing with Bandwidth Guarantees,* published in the 2000 issue of Sigmetrics. This heuristic accommodates traffic demand between pairs of endpoints in a sequential manner while, at. the same time, identifying and keeping critical links unloaded. Critical links are links that, if heavily loaded, would make it impossible to satisfy future demands between certain ingress-egress pairs.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein present illustrative examples. There may be many variations to these diagrams or the steps (or operations) described therein without departing from the spirit and scope of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing application performance on a network, the method including:
   generating a network graph from a set of application endpoints on the network, the network graph being indicative of a plurality of paths between the application endpoints, the plurality of paths each including a plurality of available resources on the network;
   annotating the network graph by associating one or more of the application endpoints with a corresponding latency annotation and a corresponding available bandwidth annotation, wherein the latency annotation includes one or more application performance constraints and the available bandwidth notation includes one or more capacity constraints; and
   formulating an end to end plan from the annotated network graph wherein the end to end plan maps one or more application requirements onto the plurality of paths in accordance with one or more end to end control adjustments;
   wherein the end to end control adjustments include a server selection adjustment, an internet service provider (ISP) selector, and an overlay routing adjustment;
   the server selection adjustment permitting selection of a server from a plurality of servers for each of a plurality of clients based upon a traffic demand for each of the plurality of clients and an available bandwidth between each of the plurality of clients and each of the plurality of servers, wherein the server selection adjustment determines one server from the plurality of servers for one client of the plurality of clients;
   the ISP selector permitting selection of a respective ISP for each of a plurality of corresponding client/server requests; and
   the overlay routing adjustment mapping a traffic demand for an application among a set of endpoints on the network.

2. A computer program product for managing application performance on a network, the computer program product comprising a storage medium readable by a processing circuit and storing instructions for execution by the processing circuit for facilitating a method comprising:
   generating a network graph from a set of application endpoints on the network, the network graph being indicative of a plurality of paths between the application endpoints, the plurality of paths each including a plurality of available resources on the network;
   annotating the network graph by associating one or more of the application endpoints with a corresponding latency annotation and a corresponding available bandwidth annotation, wherein the latency annotation includes one or more application performance constraints and the available bandwidth notation includes one or more capacity constraints; and
   formulating an end to end plan from the annotated network graph wherein the end to end plan maps one or more application requirements onto the plurality of paths in accordance with one or more end to end control adjustments;
   wherein the end to end control adjustments include a server selection adjustment, an internet service provider (ISP) selector, and an overlay routing adjustment;
   the server selection adjustment permitting selection of a server from a plurality of servers for each of a plurality of clients based upon a traffic demand for each of the plurality of clients and an available bandwidth between each of the plurality of clients and each of the plurality of servers, wherein the server selection adjustment determines one server from the plurality of servers for one client of the plurality of clients;
   the ISP selector permitting selection of a respective ISP for each of a plurality of corresponding client/server requests; and
   the overlay routing adjustment mapping a traffic demand for an application among a set of endpoints on the network.

3. The method of claim 1, further comprising determining traffic demand between the set of endpoints by utilizing a flow conservation constraint and edge capacity constraint;
   wherein the flow conservation constraint comprises capturing routing choices;
   wherein the flow conservation constraint is defined by a matrix I where $I_{ij}=1$ if edge j enters node i, and where $I_{ij}=-1$ if edge j leaves node i; and
   wherein a flow column F is defined such that $F_i$ represents a flow on edge i.

4. The method of claim 3, wherein the edge capacity constraint is $\Sigma_p * F_p < B$, where $F_p$ represents a matrix of edge flows for a commodity p, and where B is an edge capacity vector.

5. The method of claim 4, wherein the flow conservation constraint for each flow is $I.F_p = K$;
   wherein K is a vector with value $A_{ij}$ for source node i and value $-A_{ij}$ for sink node j; and
   wherein I.F is an array where the $i^{th}$ entry is 0 if node i is an intermediate node.

* * * * *